(12) United States Patent
Hung

(10) Patent No.: US 11,146,717 B2
(45) Date of Patent: Oct. 12, 2021

(54) CAMERA MODULE AND ELECTRONIC EQUIPMENT USING THE CAMERA MODULE

(71) Applicant: NANNING FUGUI PRECISION INDUSTRIAL CO., LTD., Nanning (CN)

(72) Inventor: Chih-Wei Hung, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 10 days.

(21) Appl. No.: 16/889,294

(22) Filed: Jun. 1, 2020

(65) Prior Publication Data

US 2020/0296264 A1    Sep. 17, 2020

Related U.S. Application Data

(63) Continuation of application No. 16/198,887, filed on Nov. 23, 2018, now Pat. No. 10,715,706.

(51) Int. Cl.
| | |
|---|---|
| *H04N 5/225* | (2006.01) |
| *H04N 5/232* | (2006.01) |
| *G03B 17/14* | (2021.01) |
| *G01D 5/14* | (2006.01) |
| *H04M 1/02* | (2006.01) |

(52) U.S. Cl.
CPC ........... *H04N 5/2254* (2013.01); *G01D 5/142* (2013.01); *G03B 17/14* (2013.01); *H04M 1/0264* (2013.01); *H04N 5/23203* (2013.01); *H04N 5/23216* (2013.01)

(58) Field of Classification Search
CPC ............. H04N 5/2254; H04N 5/23216; H04N 5/23203; H04M 1/0264; G01D 5/142; G03B 17/14
See application file for complete search history.

(56) References Cited

U.S. PATENT DOCUMENTS 8,073,324 B2 *  12/2011  Tsai ...................... H01F 7/0247
                                                              396/544
9,651,756 B2 *   5/2017  O'Neill .................. G02B 15/10
(Continued)

FOREIGN PATENT DOCUMENTS

| CN | 2842900 Y | 11/2006 |
|---|---|---|
| CN | 101064779 A | 10/2007 |

(Continued)

*Primary Examiner* — Hung H Lam
(74) *Attorney, Agent, or Firm* — ScienBiziP, P.C.

(57) ABSTRACT

A camera module for an imaging device includes a light sensing module, a control circuit, a mounting member, one or more external lens modules, and a magnetic sensing element. The control circuit sets photographic conditions for a certain external lens module according to a control signal, the control signal being prompted by the magnetic sensing element detecting the type of the external lens module by the arrangement of magnetic components therein, as detected by the magnetic sensing element. The magnetic components have configurations corresponding to the type of the external lens module and the magnetic components assist in aligning one external lens module to the body of the imaging device. The automatic detection and photographic settings applied can be disabled by a user.

16 Claims, 8 Drawing Sheets

(56) References Cited

U.S. PATENT DOCUMENTS

| | | | | |
|---|---|---|---|---|
| 2009/0109558 A1* | 4/2009 | Schaefer | ................ | G02B 7/02 |
| | | | | 359/827 |
| 2009/0128931 A1 | 5/2009 | Matsumoto | | |
| 2009/0143099 A1* | 6/2009 | Kang | ................ | H04N 5/23209 |
| | | | | 455/556.1 |
| 2014/0028243 A1* | 1/2014 | Rayner | ............... | H04B 1/3888 |
| | | | | 320/103 |

FOREIGN PATENT DOCUMENTS

| | | |
|---|---|---|
| CN | 107707693 A | 2/2018 |
| CN | 207283661 U | 4/2018 |
| KR | 1020070002523 A | 1/2007 |

* cited by examiner

CAMERA MODULE AND ELECTRONIC EQUIPMENT USING THE CAMERA MODULE

CROSS REFERENCE TO RELATED APPLICATIONS

This application is a continuation application of pending U.S. patent application Ser. No. 16/198,887, filed on Nov. 23, 2018 and entitled "CAMERA MODULE AND ELECTRONIC EQUIPMENT USING THE CAMERA MODULE", the entirety content of which is incorporated by reference herein.

FIELD

The subject matter herein generally relates to camera module and imaging systems.

BACKGROUND

A conventional mobile phone uses a fixture to mount different types of external lenses on a camera module of a mobile phone, such as a wide angle lens, macro lens, or fisheye lens, etc., to obtain more visual effects. However, the fixture may influence the appearance of the phone and may not be convenient to store and handle. In addition, the fixture may not be adapted to various sizes of mobile phones.

Therefore, there is room for improvement within the art.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
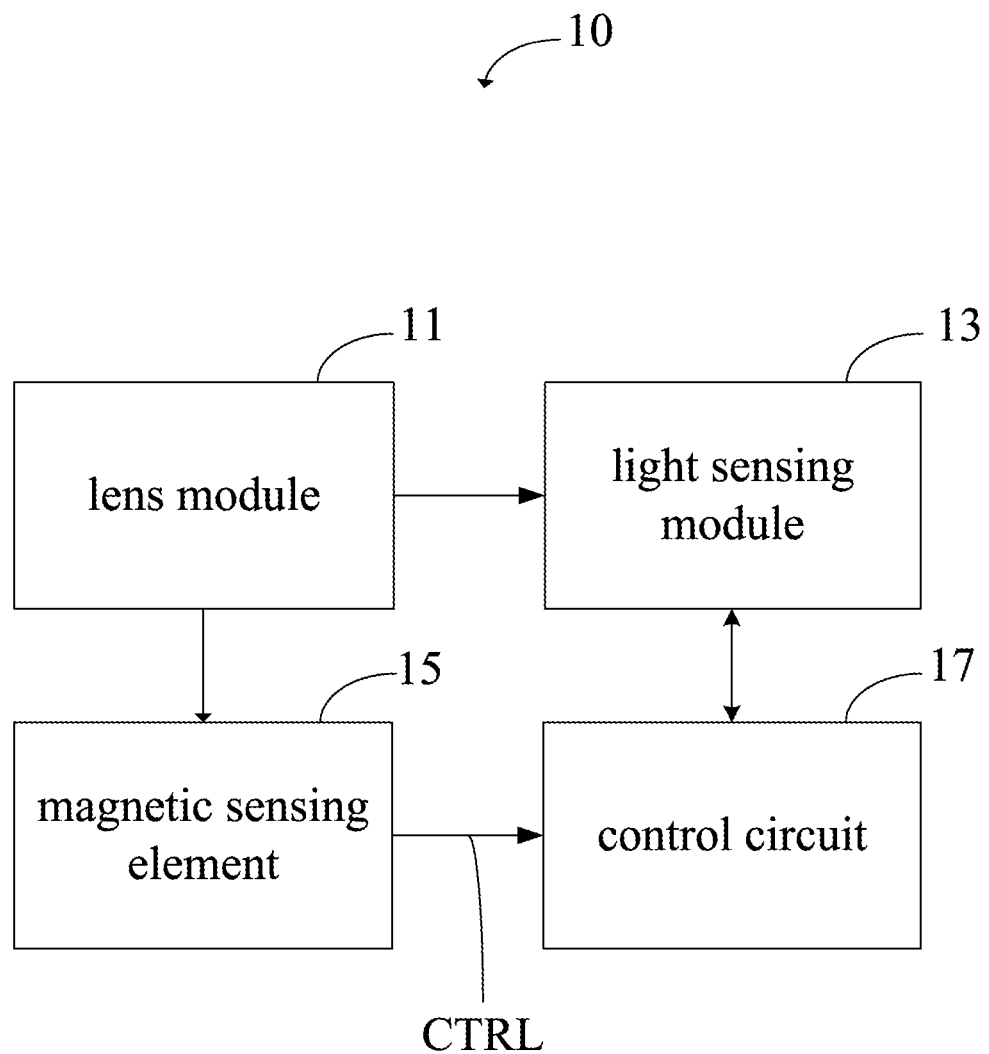
FIG. 1 is a block diagram of a camera module according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 is a block diagram of a camera module 10 according to an embodiment of the disclosure. The camera module 10 according to an embodiment of the disclosure comprises lens module 11, light sensing module 13, magnetic sensing element 15, and control circuit 17. In an embodiment, the lens module 11 can be physically external from the camera module 10. For example, the lens module 11 can be an external lens module of a digital single lens reflex camera. In another embodiment, the lens module 11 may comprise an internal lens module built into a housing of an electronic device and an external lens module externally connected to the electronic device. For example, the electronic device may be a mobile phone comprising an internal lens module, and may have an external lens module attached. The lens module or the external lens module can be detachably mounted on a mounting member of the electronic device, and may comprise a lens and one or more magnetic components. Configurations of the magnetic components correspond to the types of the lens module or the external lens module.

In the following description, the lens module is using an external lens module for a mobile phone. However, those skilled in the art can apply this teaching to the external lens module of a digital single lens reflex camera.

The light sensing module 13 comprises a light sensing element for receiving light and converting same into image signals. The magnetic sensing element 15 detects the configuration of the magnetic components, and provides control signal CTRL to the control circuit 17 according to the detected configuration of the magnetic components. In an embodiment, the magnetic sensing element 15 can be a Hall sensor. The Hall sensor works according to the Hall effect. The configurations of the magnetic components can be the magnetic pole, position, number, or magnetic strength of the magnetic components. Thus, the types of the external lens module can be detected by the Hall sensor. The control circuit 17 sets a photographing setting according to the control signal CTRL, and processes the image signals generated by the light sensing module 13 according to the photographing setting.

In an embodiment, the type of the external lens module can be a wide angle lens, macro lens, fisheye lens, telephoto lens, zoom lens, tilt-shift Lens, and image-stabilization lens. The configuration of the magnetic components corresponds to the type of external lens module. The magnetic sensing element 15 detects the configuration of the magnetic components, and provides control signal CTRL to the control circuit 17 according to the detected configuration of the magnetic components. For example, when the external lens module is detected by the magnetic sensing element 15 to be a wide-angle lens, the control signal CTRL notifies the control circuit 17 to set the photographing setting as high saturation, high sharpness, low contrast, and small aperture. When the external lens module is detected to be a telephoto lens, the control signal CTRL notifies the control circuit 17 to set the photographing setting as aperture-priority, auto-focusing, and vibration reduction. The control circuit 17 can accordingly set the photographing setting as appropriate for the type of external lens module. It is noted that the photographing settings are described by way of example, and those skilled in the art will recognize to adjust the required setting as needed.

Figure 2:
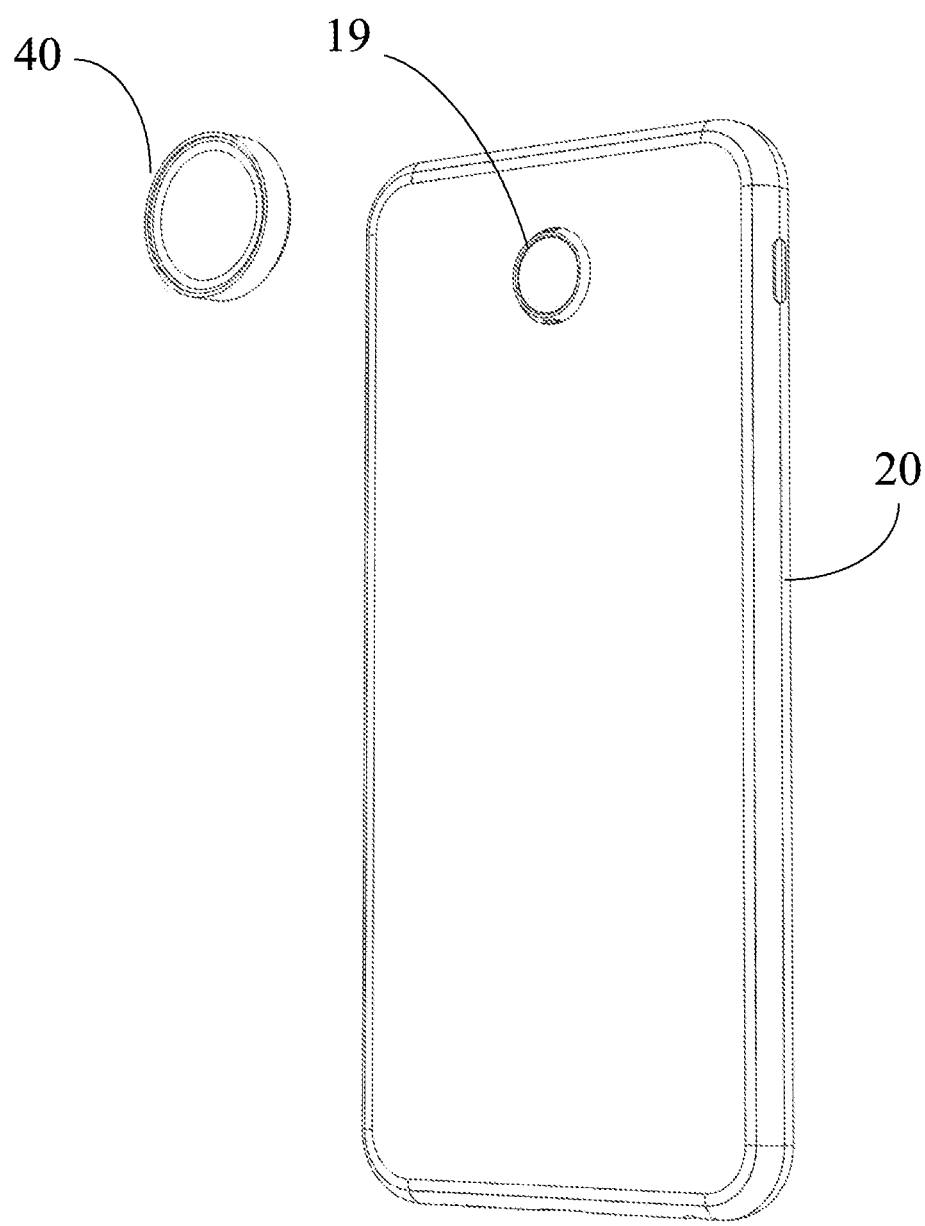
FIG. 2 is a perspective view of a camera module mounted on an electronic device according to an embodiment of the disclosure.

FIG. 2 illustrates the camera module 10 mounted on an electronic device according to an embodiment of the disclosure. According to an embodiment of the disclosure, electronic device 20 can be a mobile phone, music player, tablet, laptop computing device, wearable electronic device, data storage device, display device, desktop computer, digital camera, or other electronic device. As shown in FIG. 2, a mounting member 19 is located on the surface of the electronic device 20, with one side combined with the light sensing module (not shown in FIG. 2) in the electronic device 20, and the other side of the mounting member 19 exposed on the surface of the electronic device 20 to be joined with an external lens module 40.

Figure 3:
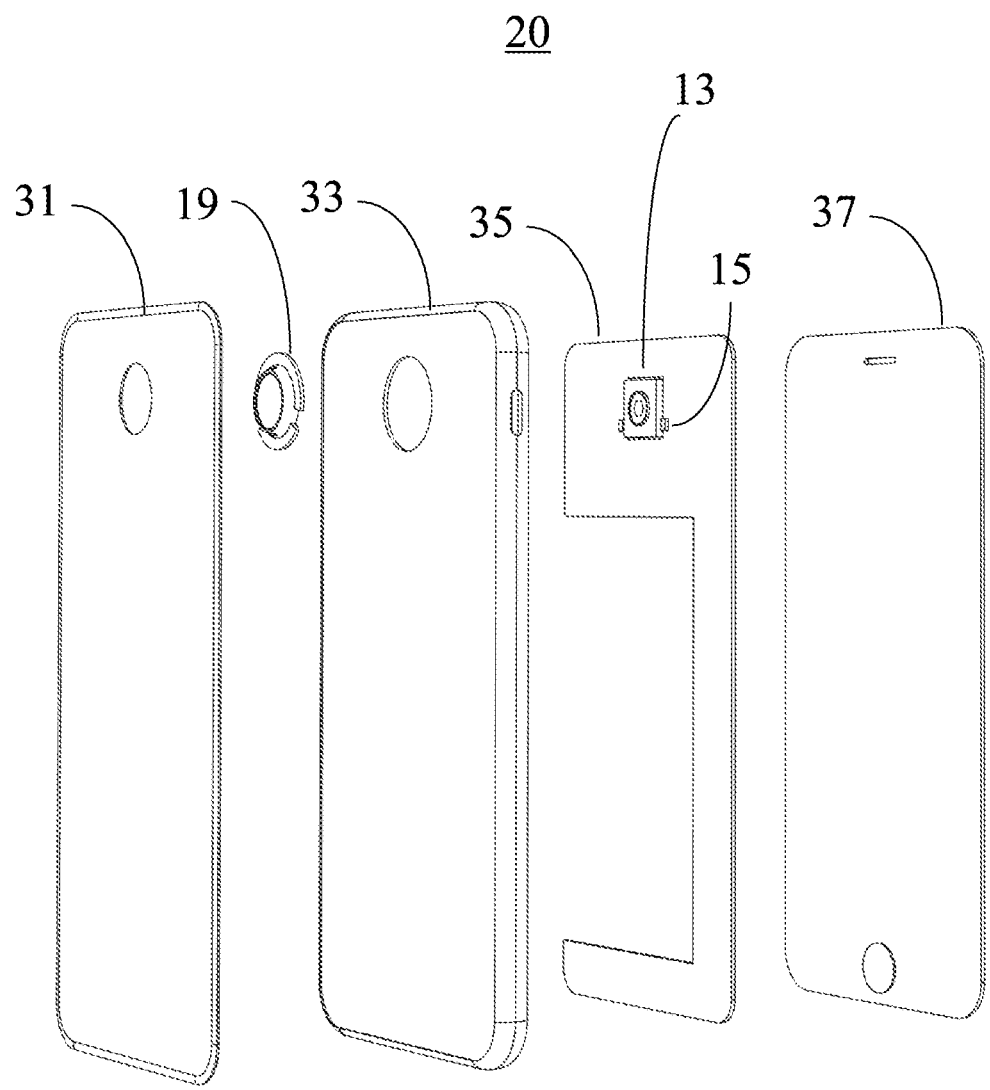
FIG. 3 is an exploded view of an electronic device according to an embodiment of the disclosure.

FIG. 3 illustrates an electronic device 20 according to an embodiment of the disclosure. The electronic device 20 comprises back cover 31, mounting member 19, middle frame 33, circuit board 35, and touch screen 37. The light sensing module 13 and the magnetic sensing element 15 are disposed on the circuit board 35. The circuit board 35 comprises a control circuit (not shown in FIG. 3) for performing functions required by the electronic device and the camera module.

Figure 4B:
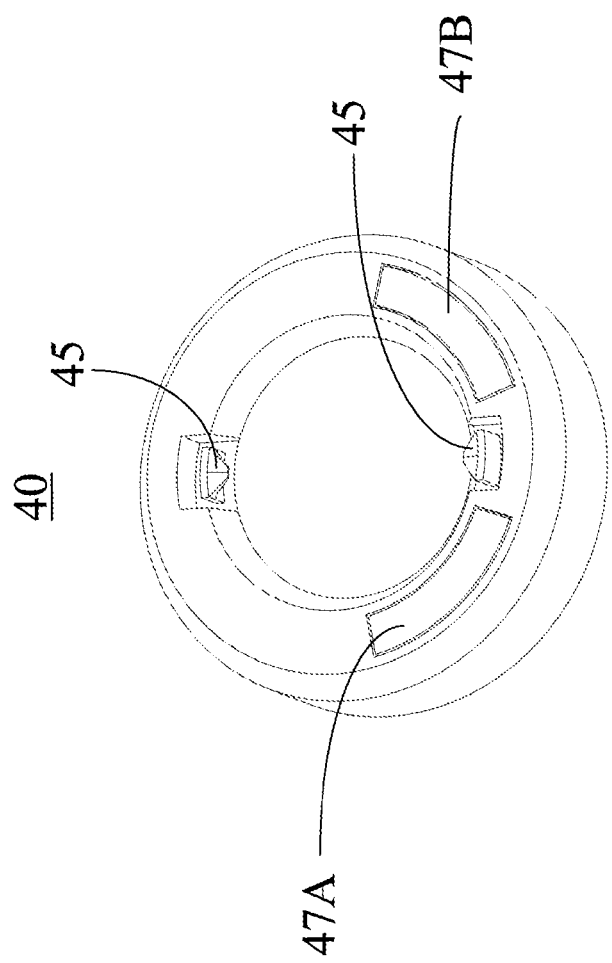
FIG. 4B is a perspective view illustrating a back surface of an external lens module according to an embodiment of the disclosure.
Figure 4A:
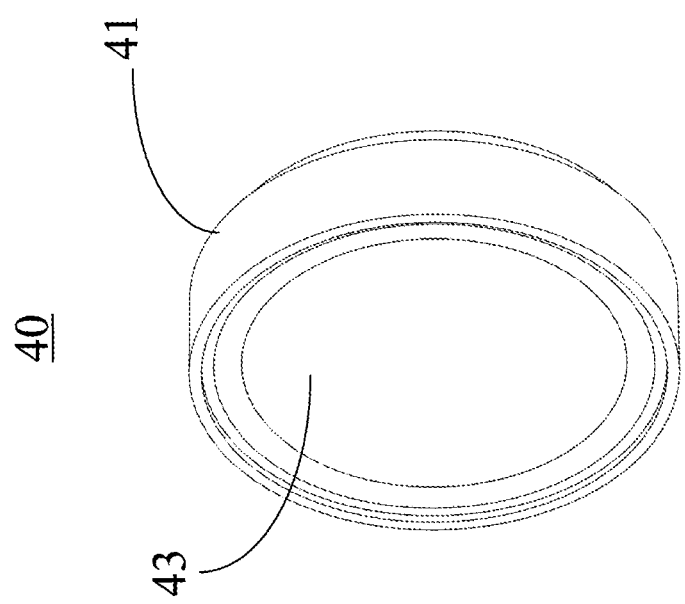
FIG. 4A is a perspective view illustrating a front surface of an external lens module according to an embodiment of the disclosure.

FIG. 4A illustrates a front surface of an external lens module 40 according to an embodiment of the disclosure. The external lens module 40 has an outer frame 41 and a lens 43. FIG. 4B shows a back surface of the external lens module 40 according to an embodiment of the disclosure. The back surface of the external lens module 40 may comprise engagement element 45. In an embodiment of the disclosure, the engagement element 45 can be a hook. The back surface of the external lens module 40 may further comprise magnetic components 47A and 47B. The configuration of the magnetic components 47A and 47B corresponds to the type of external lens module 40. According to an embodiment of the disclosure, the configuration of the magnetic components 47A and 47B is one or a combination of numbers, positions, or magnetic strengths of the magnetic components 47A and 47B, and the magnetic poles of the magnetic components 47A and 47B facing the mounting member 19.

Figure 5:
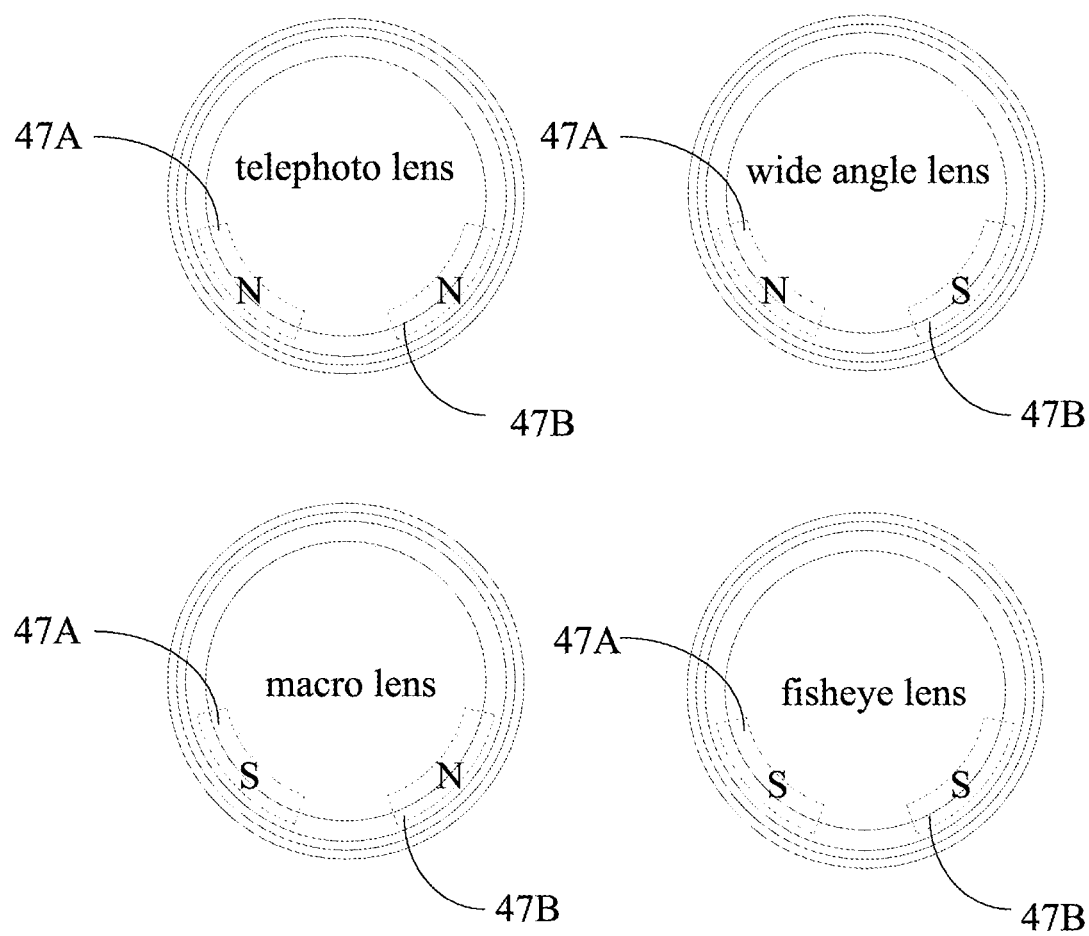
FIG. 5 is a perspective diagram illustrating configurations of a magnetic component of an external lens module according to an embodiment of the disclosure.

FIG. 5 illustrates the configuration of the magnetic components 47A and 47B of the external lens module 40 according to an embodiment of the disclosure. In the embodiment according to FIG. 5, the type of the external lens module 40 is identified by the magnetic poles of the magnetic components 47A and 47B facing the mounting member 19. For example, a telescopic lens is identified when the magnetic poles of the magnetic components 47A and 47B facing the mounting member 19 are both N magnetic poles. The external lens module 40 is identified as a macro lens when the magnetic poles of the magnetic components 47A and 47B are respectively S and N magnetic poles in that order. The external lens module 40 is identified as a wide angle lens when the magnetic poles of the magnetic components 47A and 47B are respectively N and S magnetic poles in that order. The external lens module 40 is identified as a fisheye lens when the magnetic poles of the magnetic components 47A and 47B facing the mounting member 19 are both S magnetic poles.

Figure 6B:
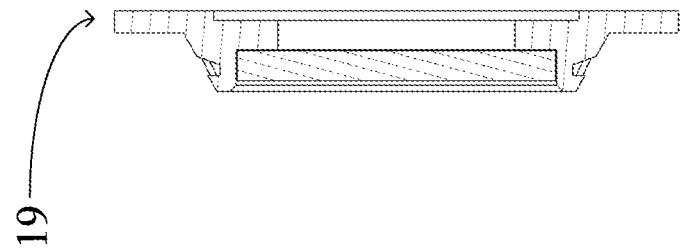
FIG. 6B is a cross-sectional view of the mounting member according to an embodiment of the disclosure.
Figure 6A:
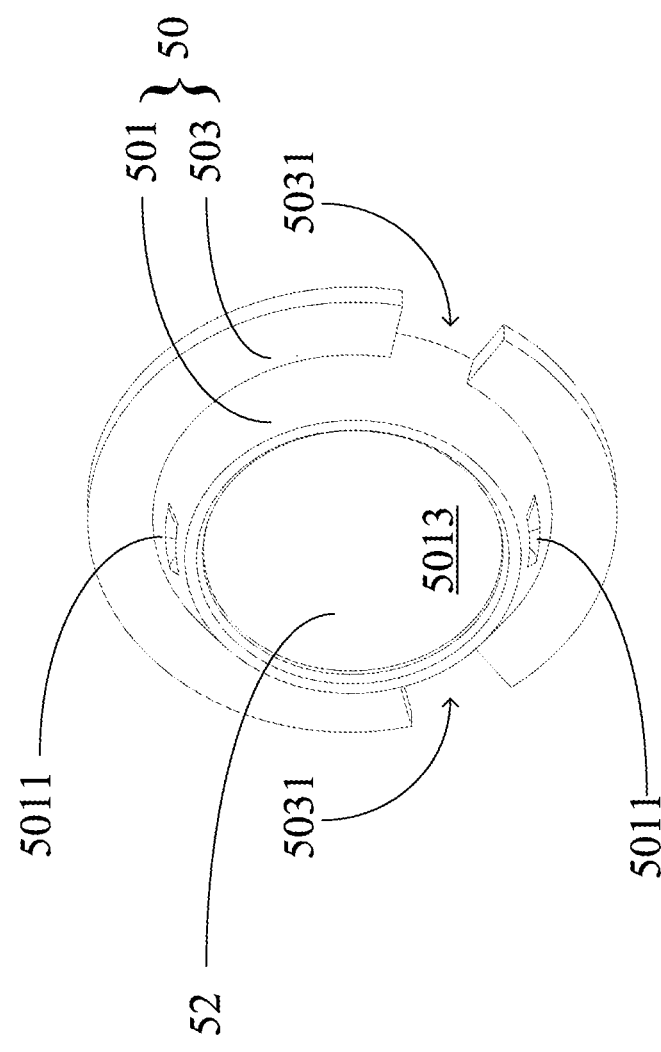
FIG. 6A is a perspective view of a mounting member according to an embodiment of the disclosure.

FIG. 6A illustrates the mounting member 19 according to an embodiment of the disclosure. FIG. 6B shows a cross-sectional view of the mounting member 19 according to an embodiment of the disclosure. According the embodiment of FIGS. 6A and 6B, the mounting member 19 comprises base portion 50 and translucent portion 52. The base portion 50 comprises joint portion 501 and platform portion 503. The joint portion 501 is to be combined with the engagement element 45 of the external lens module 40. In an embodiment, the engagement element 45 can be a hook, and the joint portion 501 is correspondingly designed to have a recess 5011. The external lens module 40 can be firmly fixed by engaging the hook with the recess 5011 of the mounting member19. The joint portion 501 has a hollowed region 5013 for installing the translucent portion 52. In an embodiment, the translucent portion 52 can be a flat lens, and the base portion 50 is made of a metal material. When the external lens module 40 is to be mounted on the mounting member 19 as illustrated in FIGS. 4A and 4B, the external lens module 40 is moved near the mounting member 19, and attraction between the magnetic components 47A and 47B and the base portion 50 assist in alignment of positioning. Next, by rotating the external lens module 40, the hook is screwed into the recess 5011 to complete the installation. In an embodiment, the platform portion 503 may comprise a gap 5031. As illustrated in FIG. 3, when the external lens module 40 is assembled to the electronic device 20, the gap 5031 of the platform portion 503 corresponds to a position of the magnetic sensing element 15 on the circuit board 35. Thus, the magnetic sensing element 15 can be housed in the gap 5031 to sense the magnetic fields of the magnetic components 47A and 47B.

Figure 7B:
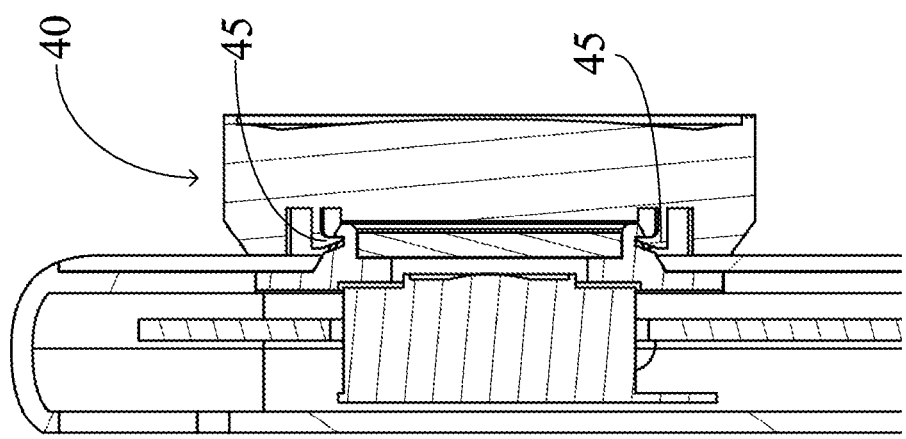
FIG. 7B is a cross-sectional view illustrating an electronic device with an external lens module according to an embodiment of the disclosure.
Figure 7A:
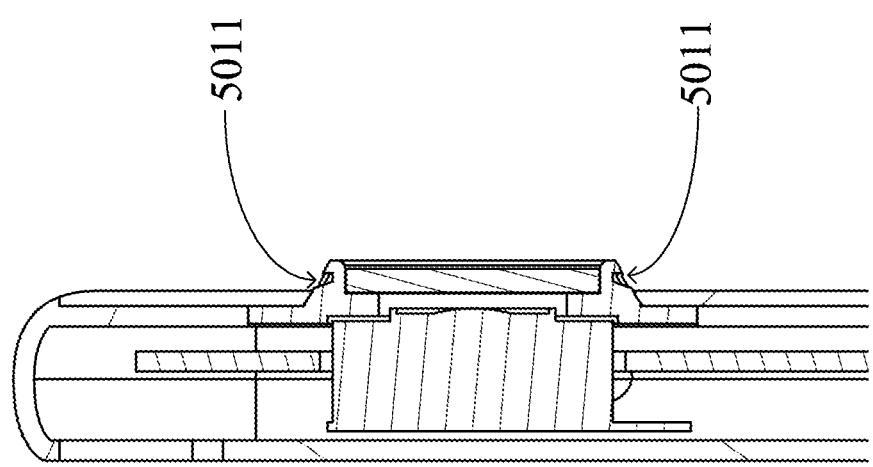
FIG. 7A is a cross-sectional view illustrating an electronic device without an external lens module according to an embodiment of the disclosure.

FIG. 7A illustrates a cross-sectional view of an electronic device 20 without the external lens module 40 according to an embodiment of the disclosure. FIG. 7B illustrates the electronic device 20 with the external lens module 40 according to an embodiment of the disclosure. As illustrated in FIGS. 7A and 7B, the engagement element 45 which is a hook in the present embodiment of the external lens module 40 is engaged with the recess 5011 of the mounting portion 19. The design of the hook can accurately align the optical centers of the external lens module 40 and the light sensing element, and obtain durable alignment.

Figure 8:
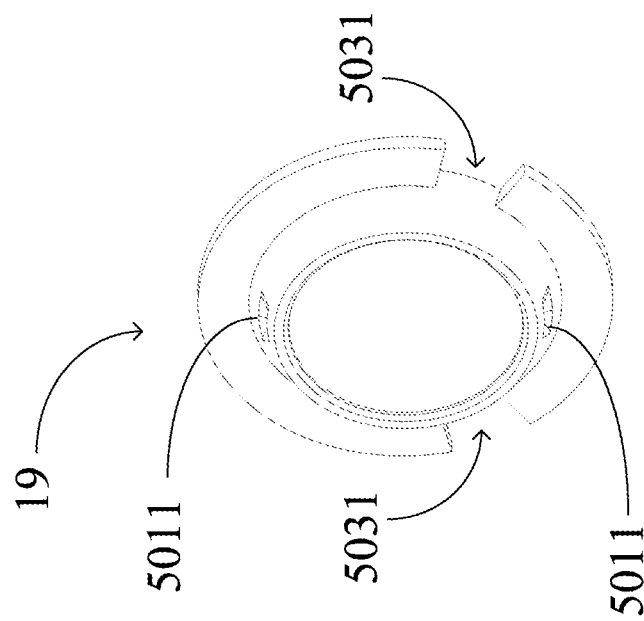
FIG. 8 is a perspective view illustrating the external lens module and the mounting member according to an embodiment of the disclosure.
Figure 8:
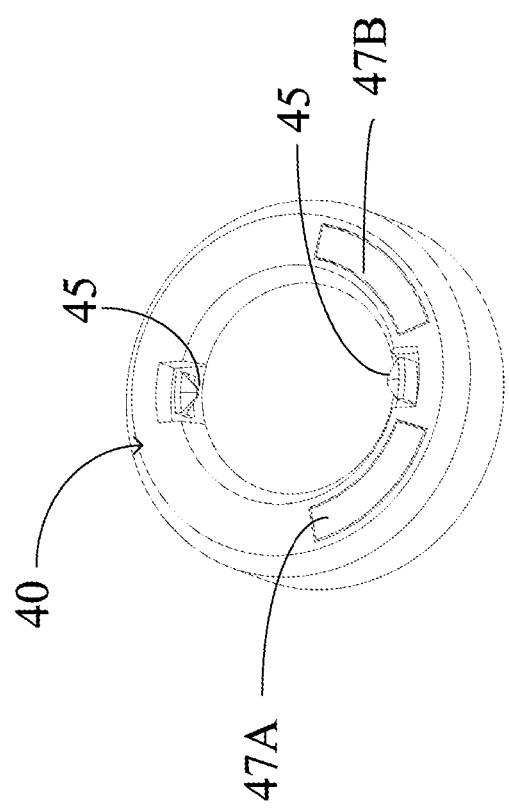

FIG. 8 shows the external lens module 40 and the mounting member 19 according to an embodiment of the disclosure. As shown in FIG. 8, there are two states when the engaging element 45 which is a hook in the preset embodiment of the external lens module 40 is screwed into the recess 5011. In a first state, positions of the magnetic sensing elements 15 (not shown, located in the gap 5031) and the magnetic components 47A and 47B are overlapped. In the first state, the magnetic sensing component 15 can recognize the configuration of the magnetic components 47A and 47B of the external lens module 40, and identify the type of external lens module 40. Thus, the magnetic sensing component 15 notifies the control circuit 17 to set a photographing setting to process the image signals.

When adjusting the photographing setting is not desired, the external lens module 40 can be mounted to the lens mounting portion 19 in a second state. In the second state, the external lens module 40 is rotated 180 degrees relative to the first state, so the magnetic sensing element 15 does not overlap with the magnetic components 47A and 47B. In the second state, the magnetic sensing component 15 is not able to recognize the configuration of the magnetic components 47A and 47B of the external lens module 40. Thus, no adjustment of the photographing setting can take place.

According to the embodiments of the camera module, the external lens module 40 can be installed through the mounting portion 19 on the electronic device 20 without additional fixtures, and the appearance and handling of the electronic device 20 is not influenced. In addition, the magnetic components 47A and 47B can simultaneously assist in the mounting and recognize the type of the external lens module 40. Communication with the magnetic sensing elements 15 through signal coupling is without physical contact, which is advantageous for waterproof design. In addition, the external lens module 40 does not require additional electronic components, such as Bluetooth, WiFi, and NFC modules, increasing reliability and decreasing size and cost.

Many details are often found in the art such as the other features of cameras. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A camera module comprising:
a light sensing module comprising a light sensing element adapted for receiving lights and converting lights into image signals;
a control circuit adapted for setting a photographing setting according to a control signal, and processing the image signals according to the photographing setting;
a mounting member, wherein one side of the mounting member is contacted with the light sensing module;
an external lens module detachably mounted on another side of the mounting member opposite to the light sensing module, the external lens module comprising a lens and at least one magnetic components, wherein the at least one magnetic component has a configuration corresponding to a type of the external lens module, and the configuration of the at least one magnetic component is selected from a combination of magnetic strength of the magnetic components, and magnetic poles of the magnetic components facing the mounting member; and
a magnetic sensing element adapted for detecting the configuration of the at least one magnetic component, and providing the control signal to the control circuit according to the configuration of the at least one magnetic component.

2. The camera module of claim 1, wherein the mounting member comprises:
a base portion comprising a joint portion and a platform portion, wherein the joint portion comprises a hollowed region; and
a translucent portion disposed in the hollowed area.

3. The camera module of claim 2, wherein the platform portion comprises a gap, and the magnetic sensing element is located in the gap.

4. The camera module of claim 2, wherein the external lens module comprises an engagement element, and the engagement element is engaged with the joint portion when the external lens module is attached to the mounting member.

5. The camera module of claim 2, wherein the base portion is made of a metal material, and the magnetic components and the base portion are magnetically attracted when the external lens module is attached to the mounting member.

6. The camera module of claim 1, wherein the light sensing element, the control circuit and the magnetic sensing element are installed on a circuit board.

7. The camera module of claim 1, wherein the magnetic sensing element is a Hall sensor.

8. The camera module of claim 1, further comprising an internal lens module disposed between the light sensing module and the mounting member.

9. An electronic device, comprising:
a housing; and
a camera module received in the housing, comprising:
a light sensing module comprising a light sensing element adapted for receiving lights and converting lights into image signals;
a control circuit adapted for setting a photographing setting according to a control signal, and processing the image signals according to the photographing setting;
a mounting member, wherein one side of the mounting member is contacted with the light sensing module;
an external lens module detachably mounted on another side of the mounting member opposite to the light sensing module, the external lens module comprising a lens and at least one magnetic components, wherein the at least one magnetic component has a configuration corresponding to a type of the external lens module, and the configuration of the at least one magnetic component is selected from a combination of magnetic strength of the magnetic components, and magnetic poles of the magnetic components facing the mounting member; and
a magnetic sensing element adapted for detecting the configuration of the at least one magnetic component, and providing the control signal to the control circuit according to the configuration of the at least one magnetic component.

10. The electronic device of claim 9, wherein the mounting member comprises:

a base portion comprising a joint portion and a platform portion, wherein the joint portion comprises a hollowed region; and a translucent portion disposed in the hollowed area.

11. The electronic device of claim 10, wherein the platform portion comprises a gap, and the magnetic sensing element is located in the gap.

12. The electronic device of claim 10, wherein the external lens module comprises an engagement element, and the engagement element is engaged with the joint portion when the external lens module is attached to the mounting member.

13. The electronic device of claim 10, wherein the base portion is made of a metal material, and the magnetic components and the base portion are magnetically attracted when the external lens module is attached to the mounting member.

14. The electronic device of claim 9, wherein the light sensing element, the control circuit and the magnetic sensing element are installed on a circuit board.

15. The electronic device of claim 9, wherein the magnetic sensing element is a Hall sensor.

16. The electronic device of claim 9, further comprising an internal lens module disposed between the light sensing module and the mounting member.

\* \* \* \* \*